H. A. HILLENBRAND.
INTERCHANGEABLE SPRING TOOL HOLDER FOR LATHES.
APPLICATION FILED SEPT. 2, 1905.
935,656.
Patented Oct. 5, 1909.
3 SHEETS—SHEET 1.
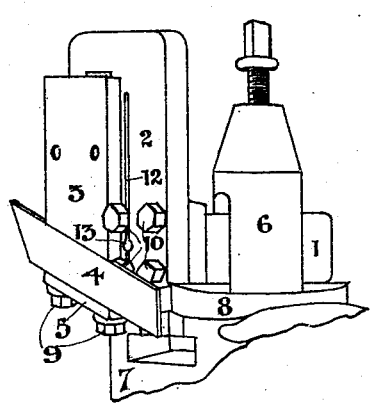
Fig. 1.
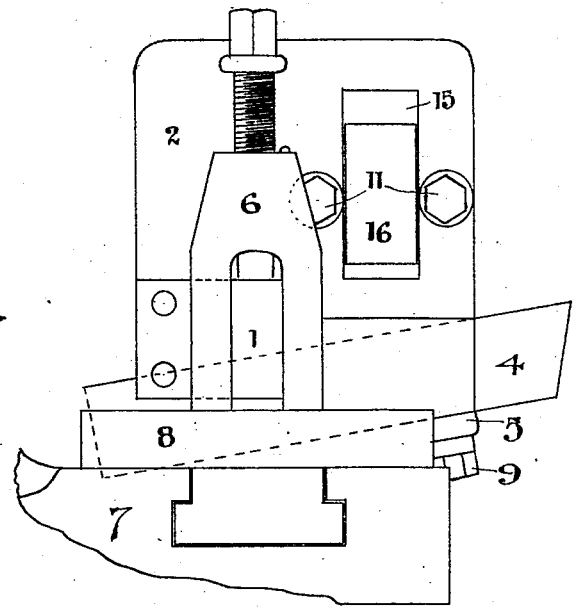
Fig. 2.
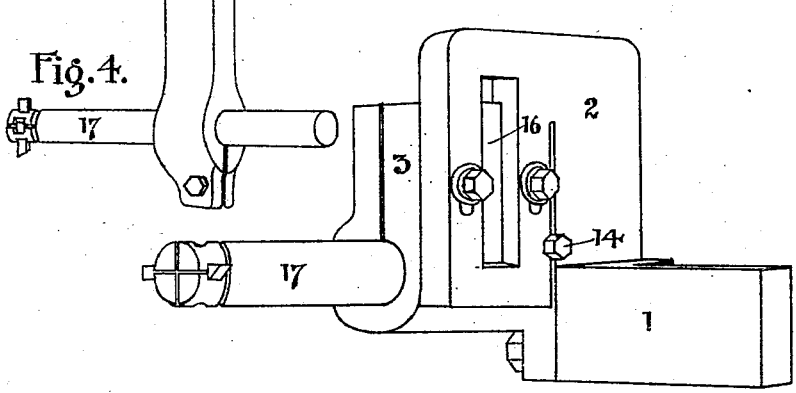
Fig. 4.
Fig. 3.
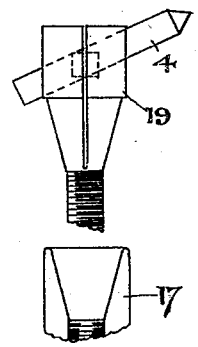
Fig. 5.
Witnesses
J. Stuart Cooke.
F. H. Kappa.
Inventor
Herman Archa Hillenbrand
by Abraham Knobel
Attorney H. A. HILLENBRAND.
INTERCHANGEABLE SPRING TOOL HOLDER FOR LATHES.
APPLICATION FILED SEPT. 2, 1905.

935,656.

Patented Oct. 5, 1909.
3 SHEETS—SHEET 2.

Witnesses
J. Martinsooke.
F. H. Keppa.

Inventor
Herman Archer Hillenbrand,
by Abraham Knobel,
Attorney.

H. A. HILLENBRAND.
INTERCHANGEABLE SPRING TOOL HOLDER FOR LATHES.
APPLICATION FILED SEPT. 2, 1905.

935,656.

Patented Oct. 5, 1909.

3 SHEETS—SHEET 3.

Witnesses

Inventor
Herman Archer Hillenbrand
by Abraham Knobel,
Attorney.

UNITED STATES PATENT OFFICE.

HERMAN ARCHER HILLENBRAND, OF LOUISVILLE, KENTUCKY.

INTERCHANGEABLE SPRING TOOL-HOLDER FOR LATHES.

935,656.

Specification of Letters Patent. Patented Oct. 5, 1909.

Application filed September 2, 1905. Serial No. 276,890.

*To all whom it may concern:*

Be it known that I, HERMAN ARCHER HILLENBRAND, a citizen of the United States, residing at Louisville, in the county of Jefferson and State of Kentucky, have invented a new and useful Interchangeable Spring Tool-Holder for Lathes, of which the following is a specification.

This invention relates to means for holding the tool-blades and points used in lathe and planer practice, and the objects of my improvement are, to provide a holder which shall securely hold cutting-off tool-blades with a minimum risk of breakage; that shall hold cutting-off blades, thread cutting points and other tool-points sufficiently yieldingly to avoid the danger of breaking the tools, of the tools gouging, and the work climbing, that is common with rigidly held tools; to provide such a holder which may be made rigid when required; to provide a holder with which work may be done right up to the face plate or a flange either on the head-stock or tail-stock side; that may be quickly and easily changed from right-hand to left-hand; to provide different attachments for the same holder adapted to hold flat blades at an angle for top rake, horizontal blades without top rake or slight negative rake or boring-bars; to provide new and efficient means for fastening tool-points in boring-bars, and slotting-bars for planer and shaper practice; to provide a holder by means of which the tool-point may be easily and quickly adjusted vertically without changing the angle of the rake. These objects I attain by means of the device illustrated in the accompanying drawings, in which:—

Figure 6:
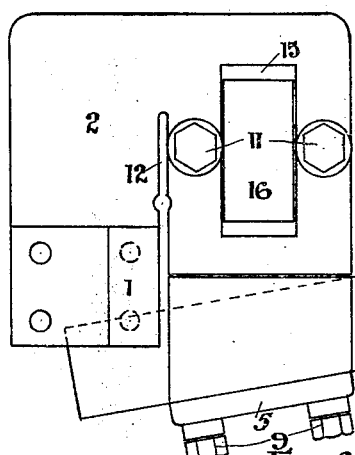
Figure 7:
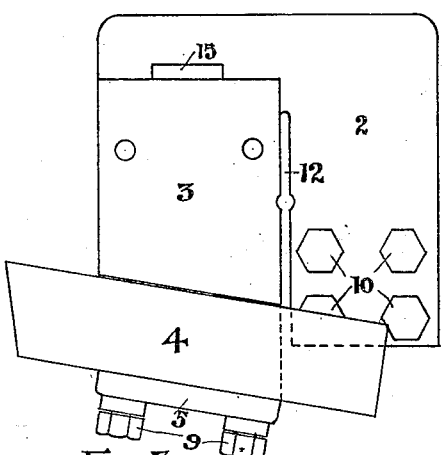
Figure 8:
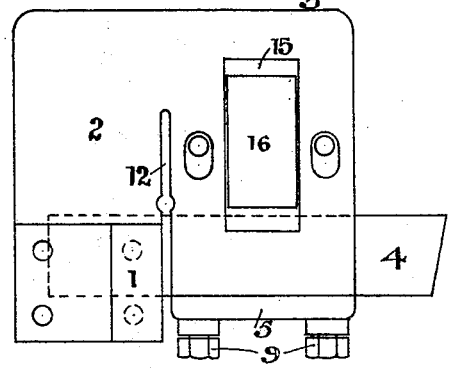
Figure 9:
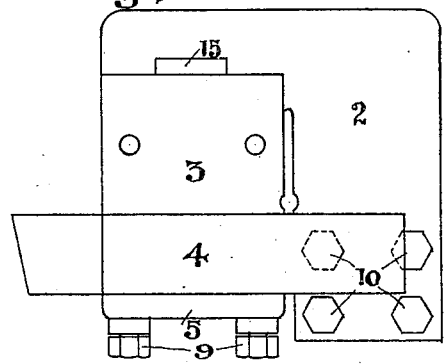
Figure 10:
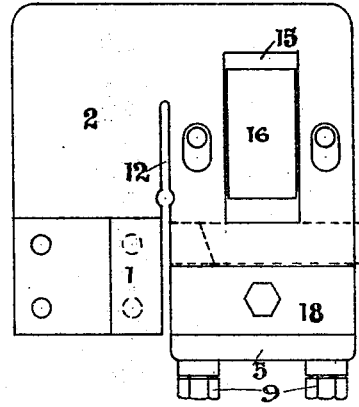
Figure 11:
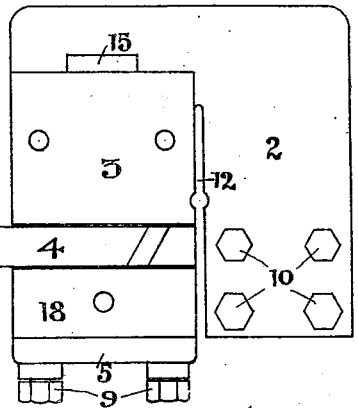
Figure 12:
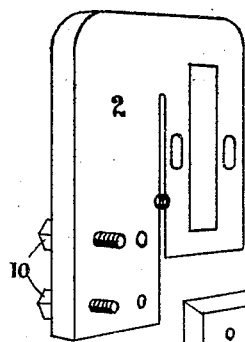
Figure 13:
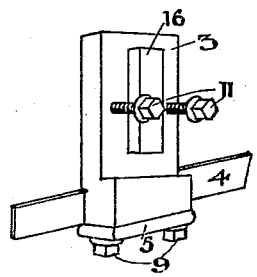
Figure 14:
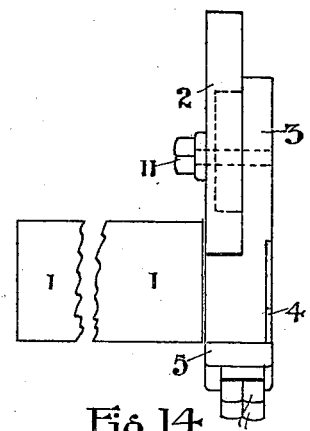
Figure 15:
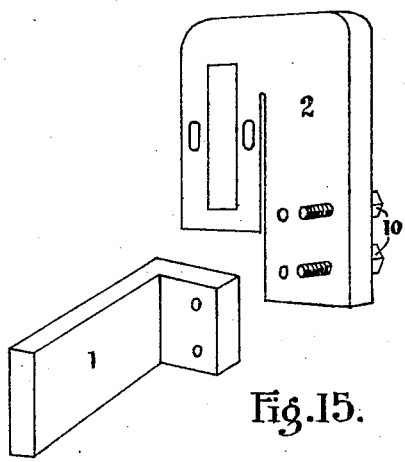
Figure 16:
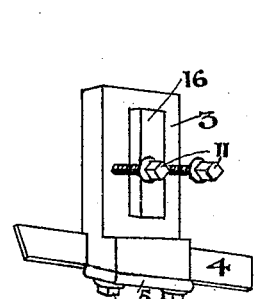
Figure 17:
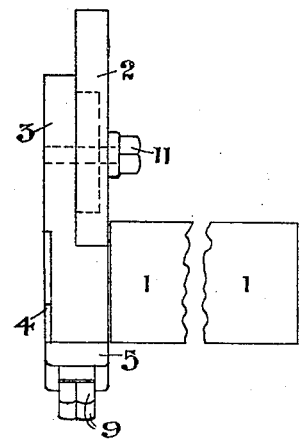
Figure 18:
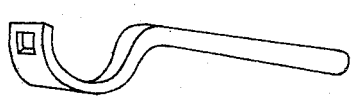

Figure 1 is a perspective view of the tool-holder held in the tool-post and a portion of the usual T-slotted cross-slide of a lathe; Fig. 2, a side elevation; Fig. 3, a perspective view with boring-bar; Fig. 4, a perspective view of a slotting-bar for planer use; Fig. 5, a detail view of the tool-holding end of the boring-bar; Fig. 6, a side elevation of the holder from the tool-post side showing the blade held at an angle for top rake; Fig. 7, a side elevation from the side opposite the tool-post showing the blade held at an angle for top rake; Fig. 8, a side elevation from the tool-post side showing a horizontal blade; Fig. 9, a side elevation from the side opposite the tool-post showing a horizontal blade; Fig. 10, a side elevation from the tool-post side showing a horizontal diamond point tool; Fig. 11, a side elevation from the side opposite the tool-post showing the horizontal diamond point tool; Fig. 12, a detail perspective view showing the stem removed from the body-piece; Fig. 13, a detail perspective view of the adjustable tool-clamp for slanting cutting-off blade for right-hand tool for cutting up to the face-plate; Fig. 14, an edge view of the tool shown in Figs. 12 and 13 as assembled; Fig. 15, a detail perspective view of the tool-clamp for slanting cutting-off blade for left-hand tool for cutting up to a shoulder on the tail-stock side; Fig. 16, a detail perspective view showing the stem removed from the body piece; Fig. 17, an edge view of the holder shown in Figs. 15 and 16 assembled; and, Fig. 18 is the spanner wrench for tightening the tools in the boring-bar.

Similar reference numerals refer to similar parts throughout the several views of the drawing.

The stem 1, for securing in the tool-post, has its end for attaching to the body-plate of the holder formed at a right angle to the stem and with a plane vertical face. This stem is disposed in the tool-post longitudinally relative to the bed of the lathe instead of transversely as is customary. The plane, vertical face is provided with threaded holes, preferably four in number, to receive cap-screws 10. A flat body-plate, 2, is provided, adapted to lie against the vertical plane surface of stem 1, and provided with holes through which cap-screws 10 may be passed with a snug, sliding fit. By this means stem 1 may be bolted to body-plate 2 on either side thereof by reversing the stem (Figs. 12, 14, 16, 17). Body-plate 2 is also provided with a vertical slot, 12, in order to allow the tool-point to spring downward and away from the work when overtaxed. A mortise, 15, is cut through plate 2, rectangular in shape, and longer vertically than transversely. On each side of mortise 15 are provided holes through which cap-screws 11 pass. These holes are elongated vertically to provide for adjustment of cap-screws 11. Near the lower end of slot 12 a threaded hole is provided adapted to receive a firmer cap-screw, 14, for the purpose of changing from a spring tool to a rigid one whenever required.

An adjustable tool-clamp 3 is provided, adapted to be fastened on either face of body-plate 2. This tool-clamp, 3, is provided on its inner face with a tenon, 16, adapted to fit snugly into mortise 15, and slightly shorter than said mortise to allow vertical adjustment therein. On either side of tenon 15 are provided threaded holes corresponding to the elongated holes in either side of the mortise in body-plate 2, adapted to receive cap-screws 11. By this means tool-clamp 3 may be securely fastened on either face of body-plate 2 reversibly and may be adjusted vertically. The front face of tool-clamp 3 is provided, at the lower end, with a rabbet adapted to receive a tool-point or blade 4. The lower edge of clamp-plate 3 is adapted for receiving and provided with a clamping plate, 5, which is secured by means of cap-screws 9. The tool-rabbet may be cut at any angle determined by the amount of top rake desired. For tools at an angle a separate tool-clamp 3 is provided for right and left-hand tools, (Figs. 13, 15,) but when horizontal tools are used the blade may be simply reversed in the rabbet (Figs. 8, 9, 10, 11).

When small, square tool-points are used (Figs. 10, 11), a clamping piece, 18, is provided and fastened to tool-clamp 3 by means of a transverse cap-screw, the hole in the clamping-piece 18 preferably being threaded and the hole in the body of clamp 3 being vertically elongated to provide for adjustment of plate 18 for tightening the tool-point 4 by means of screws 9. It will be understood that by this means the outer face of the tool-blade is brought flush with the face of clamp 3 and plate 18 so that work may be done right up against the face-plate, or a shoulder on the tail-stock side.

A modification of the tool-clamp is provided for holding a boring-bar, 17. In this instance the hole for receiving the boring-bar is slotted upward and longitudinally relative to the bar (Fig. 3), and only the outer portion of the clamp is threaded to receive screws 11, the inner layer being counter-bored so that the action of bolts 11 is to draw the outer portion up and clamp the bar at the same time that clamp 3 is fastened to body-plate 2.

The boring and slotting-bar illustrated in Figs. 3, 4, and 5 is a round, smooth bar, having an axial bore at one end, the portion toward the end being tapered and the part beyond the taper being threaded. A split-chuck plug, 19, is provided, having a reduced portion threaded to screw into the threaded portion of bar 17, a tapered portion corresponding with the taper in bar 17 and a slotted portion adapted to receive a tool-blade, 4. The slots for tool-blade 4 may be made perpendicular or at an angle (Fig. 5). Two slots may be provided in the same plug, one perpendicular and the other at an angle. The exposed end of plug 19 is slotted longitudinally preferably with slots intersecting at 90 degrees, these slots passing through the tool slots and to the base of the tapered portion. To insert the blade and secure it, it is pushed through one of the tool slots while the plug is unscrewed so that the taper is loose, and the plug is then screwed up. If it is desired to secure the blade firmly, the spanner wrench (Fig. 18) may be applied over the end of the tool-blade. If the boring-bar is to be used for slotting in the planer or shaper, a holder, such as is illustrated in Fig. 1, is provided. This consists of a straight shank, 20, like an ordinary lathe tool shank, expanded at one end and provided with a transverse hole adapted to receive bar 17 snugly. The shank 20 is slitted out from the hole, for bar 17, to the end, and provided with a clamping-screw near the end for securely clamping bar 17 in place. The bar 20 is used in the tool post of a planer or a shaper in the same manner as the conventional lathe tool.

Having thus described and illustrated my invention, so that the manner of construction and using it will be obvious to any one skilled in the art pertaining thereto, I claim—

1. A tool-holder for lathes and planers, comprising a shank for fastening in the tool-post, a flat body-plate secured vertically to said shank, and provided with a transverse vertical slot open at the bottom to allow the front part carrying the tool to spring back, an enlargement in said slot to receive a screw to render said body plate rigid, and a tool-holding-plate secured to the front part of said body-plate.

2. A tool-holder for lathes and planers comprising a shank for fastening in the tool-post, a flat reversible body-plate detachably bolted to said shank, and a reversible tool-clamping plate detachably bolted to said body-plate, said reversible plates adapting the tool to be used either as right-hand or left-hand.

3. In a tool-holder for lathes and planers, the combination of a shank for holding in a tool-post, a flat body-plate vertically bolted to said shank and provided with a vertical slot 12 open at the bottom to allow the part carrying the tool to spring back, a tool-holding-plate, means for securing it to the body-plate at one side of the slot, and means for securing a tool to the tool-holding-plate transverse of the slot.

HERMAN ARCHER HILLENBRAND.

Witnesses:
ABRAHAM KNOBEL,
J. A. MARTIN-COOKE.